T. E. BLAIR.
HAME HOUSING.
APPLICATION FILED APR. 15, 1910.
980,749.
Patented Jan. 3, 1911.
2 SHEETS—SHEET 2.
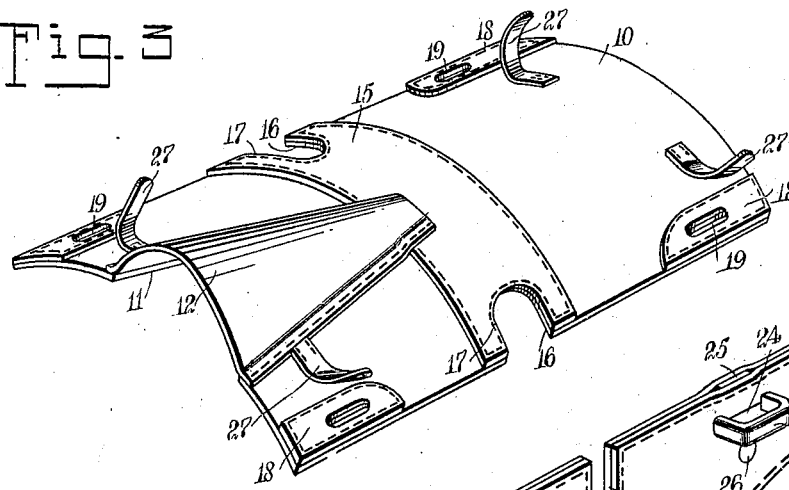
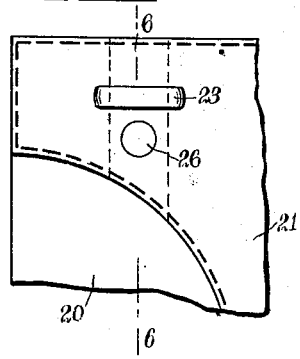
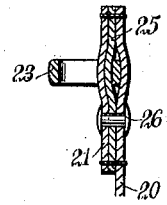
WITNESSES:
INVENTOR
Thomas E Blair
BY
ATTORNEYS

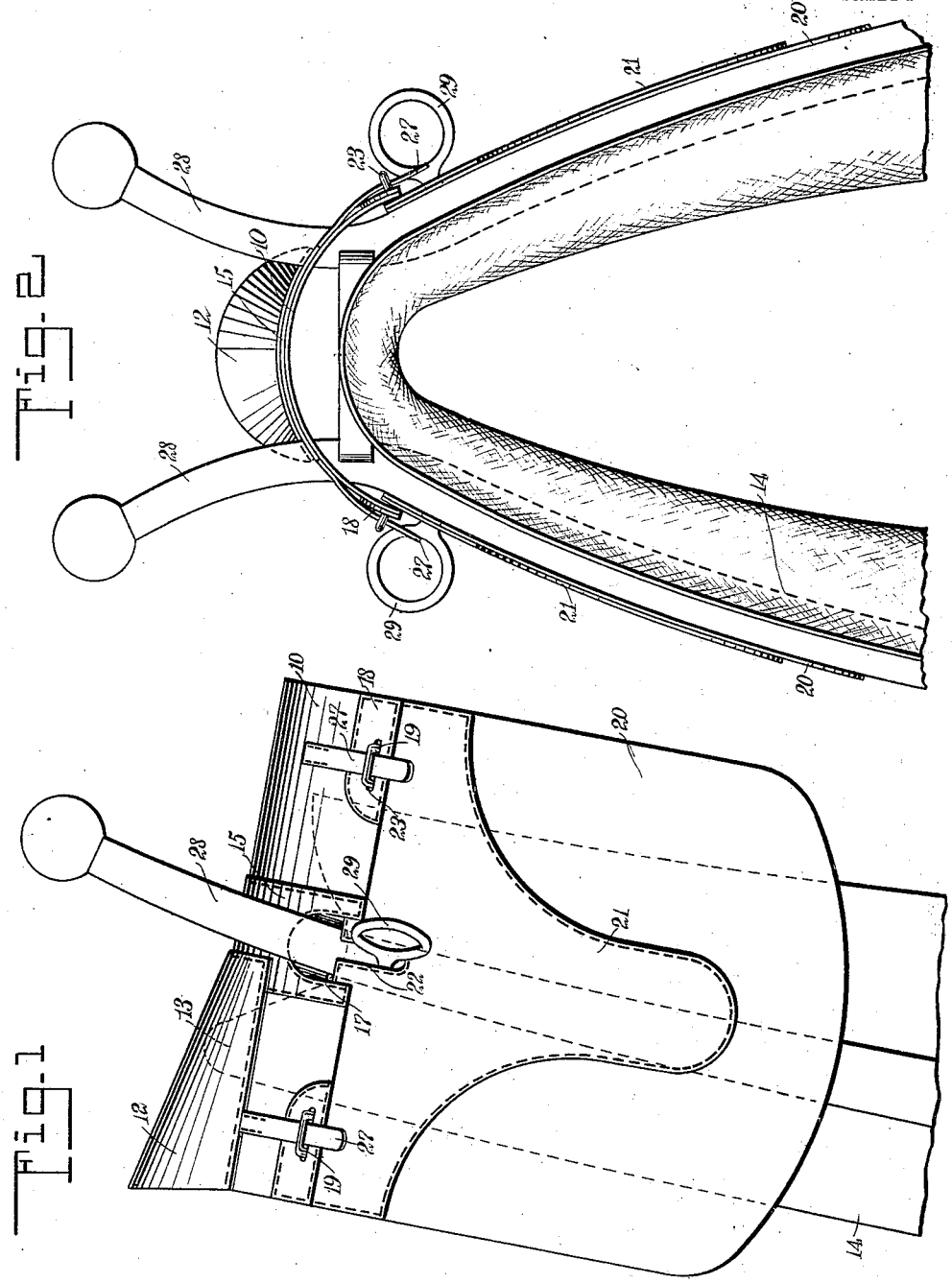

UNITED STATES PATENT OFFICE.

THOMAS ELIAS BLAIR, OF PORTLAND, OREGON.

HAME-HOUSING.

980,749.  Specification of Letters Patent.  Patented Jan. 3, 1911.

Application filed April 15, 1910. Serial No. 555,723.

*To all whom it may concern:*

Be it known that I, THOMAS E. BLAIR, a citizen of the United States, and a resident of Portland, in the county of Multnomah and State of Oregon, have invented a new and Improved Hame-Housing, of which the following is a full, clear, and exact description.

This invention relates to housings for the hames of harness collars, and has reference more particularly to a hame housing comprising a cap, and skirts associated therewith, openings being provided to permit the hames of the collar to extend through the housing.

The object of the invention is to provide a simple, strong and durable housing for the hames of a harness collar for use upon draft animals, which can be placed in position, or removed from the harness, with great rapidity, which can be changed from one side of the harness to another, which requires no alteration in the harness in order to fit properly, which can be manufactured inexpensively, from different materials, and which can be fitted to the harness with which it is to be used, without necessitating the exercise of special skill or knowledge.

The invention consists in the construction and combination of parts to be more fully described hereinafter and particularly set forth in the claims.

Reference is to be had to the accompanying drawings, forming a part of this specification, in which similar characters of reference indicate corresponding parts in all the views, and in which—

Figure 1 is a side elevation of the upper part of a harness collar showing an embodiment of my invention applied thereto; Fig. 2 is a rear elevation of the upper part of the collar, having the housing mounted thereon; Fig. 3 is a perspective view of the cap constituting a part of the housing; Fig. 4 is a perspective view of one of the housing skirts; Fig. 5 is a plan view of part of one of the skirts, showing a detail of construction; and Fig. 6 is a transverse section on the line 6—6 of Fig. 5.

Before proceeding to a more detailed explanation of my invention, it should be clearly understood that the housing can be fashioned from different kinds of materials. While I have shown in the accompanying drawings a housing fashioned solely from leather, it can also be made partly or entirely from heavy duck or canvas. I have found that a housing made from a combination of canvas and leather is satisfactory, especially for use in summer, when the skirts are preferably lighter, owing to the warm weather.

The cap of the housing is shaped to fit upon the collar as shown in Figs. 1 and 2. A separate shaping piece as shown for example, can be used, or the leather or other material of the cap as a whole can be shaped in any suitable way, to cause it to conform to the collar.

Certain of the details of construction form no part of the invention, and can be altered in accordance with individual preference or special conditions, without departing from the underlying spirit of the invention.

Referring more particularly to the drawings, I employ a cap 10, which is rounded transversely of its length, and in the form shown for example herewith, at the forward end has a cutaway part 11, over which is fitted a shaping piece 12, preferably tapered, and upwardly curved. This permits the cap to fit conveniently over the front or peak 13 of the collar 14 used, for example, in heavy working harness. A reinforcing strip 15 extends transversely across the cap, which at the longitudinal edges, under the reinforcing strip, is provided with rounded recesses 16. The strip itself, has recesses 17, registering with the recesses 16. At the corners, the cap has reinforcing pieces 18. Elongated openings 19 are formed through the cap and the reinforcing pieces 18, for a purpose which will appear hereinafter. It will be understood that the shaping piece 12, the reinforcing strip 15, and the pieces 18, are secured in place in any suitable manner, preferably by lines of stitching.

I employ skirts 20 of any suitable form, and detachably arranged at the sides of the cap. Each skirt has sewed, or otherwise fastened thereon, an outer reinforcing piece 21, which has any desired ornamental form. At the upper edges, the skirts have formed in the bodies thereof, and in the reinforcing pieces, rounded recesses 22 which are located opposite to the recesses 16 and 17 of the cap, when the parts are assembled as is shown in Fig. 1. I employ loops or eyelets 23 of metal, or other suitable material, which are arranged to extend through slits 24 of the reinforcing pieces 21, so that parts of the loops are located between the skirts and the pieces 21. Holding strips 25 are located between the skirts and the pieces 21, within the loops 23, to secure the latter in position, as is shown in Fig. 6. I use rivets 26, extending through the skirts, the reinforcing pieces 21 and the holding strips 25, to secure the parts firmly together. Lines of stitching serve a like purpose.

The openings 19 are shaped and positioned to receive the corresponding loops 23. The cap has sewed or otherwise fastened thereon billets 27, adapted to be inserted in the loops when the latter project through the openings 19 to secure the skirts to the cap, as is shown most clearly in Fig. 1.

The hames 28 of the collar, extend through the openings in the housing formed by the recesses 16, 17 and 22. The recesses 22 are elongated so that the rein terrets 29 can also project through the housing. The recesses 16 and 17 are somewhat wider than the recesses 22, and when the housing is placed upon the collar, the cap is positioned between the upper projecting ends of the hames, with the latter in the recesses 16 and 17. The skirts are then attached to the cap, and the housing is in place. It will be understood that the skirts can be removed from the cap without difficulty, by merely withdrawing the billets from the loops and slipping the loops out of the recesses 19.

Having thus described my invention, I claim as new, and desire to secure by Letters Patent:

1. A hame housing, comprising a cap having side edge recesses, removable skirts associated therewith at the opposite sides, and means for removably connecting said skirts and said cap, said recesses permitting the hames to project through the housing.

2. A hame housing, comprising a cap, removable skirts associated therewith, and means for securing said skirts at the opposite sides of said cap, said cap and said skirts having overlapping recesses forming the openings for the hames to project through.

3. A hame housing, comprising a cap having edge recesses adapted to permit the hames to project through the housing, said cap having openings and being provided with billets, and separate skirts at the opposite sides of said cap and each having loops adapted to project through said openings to receive said billets, whereby said cap and said skirts can be removably associated.

4. A hame housing, comprising a cap having at the opposite longitudinal edges, recesses, a reinforcing strip extending across said cap and having recesses registering with said first-mentioned recesses, said cap having openings at the corners, and skirts, each having a reinforcing piece, and provided with loops adapted to be received in said openings of said cap, said skirts having recesses at the upper edges, adjacent to said recesses of said cap when the parts are assembled, said cap having billets adapted to be inserted in said loops to secure said skirts in position, said recesses serving to permit the hames and the rein terrets to project through the housing.

5. A hame housing, comprising a cap having edge recesses adapted to permit the hames to project through the housing, said cap having openings and being provided with billets, and skirts having reinforcing pieces, said pieces having slits, loops mounted in said slits and having parts positioned between said skirts and said reinforcing pieces, holding strips positioned between said skirts and said reinforcing pieces within said loops, and rivets for securing said skirts, said strips and said reinforcing pieces together, said loops being adapted to project through said openings to receive said billets, whereby said cap and said skirts can be removably held together.

In testimony whereof I have signed my name to this specification in the presence of two subscribing witnesses.

THOMAS ELIAS BLAIR.

Witnesses:
V. E. HOLSTON,
J. W. WESTBROOK.